Patented Jan. 4, 1938

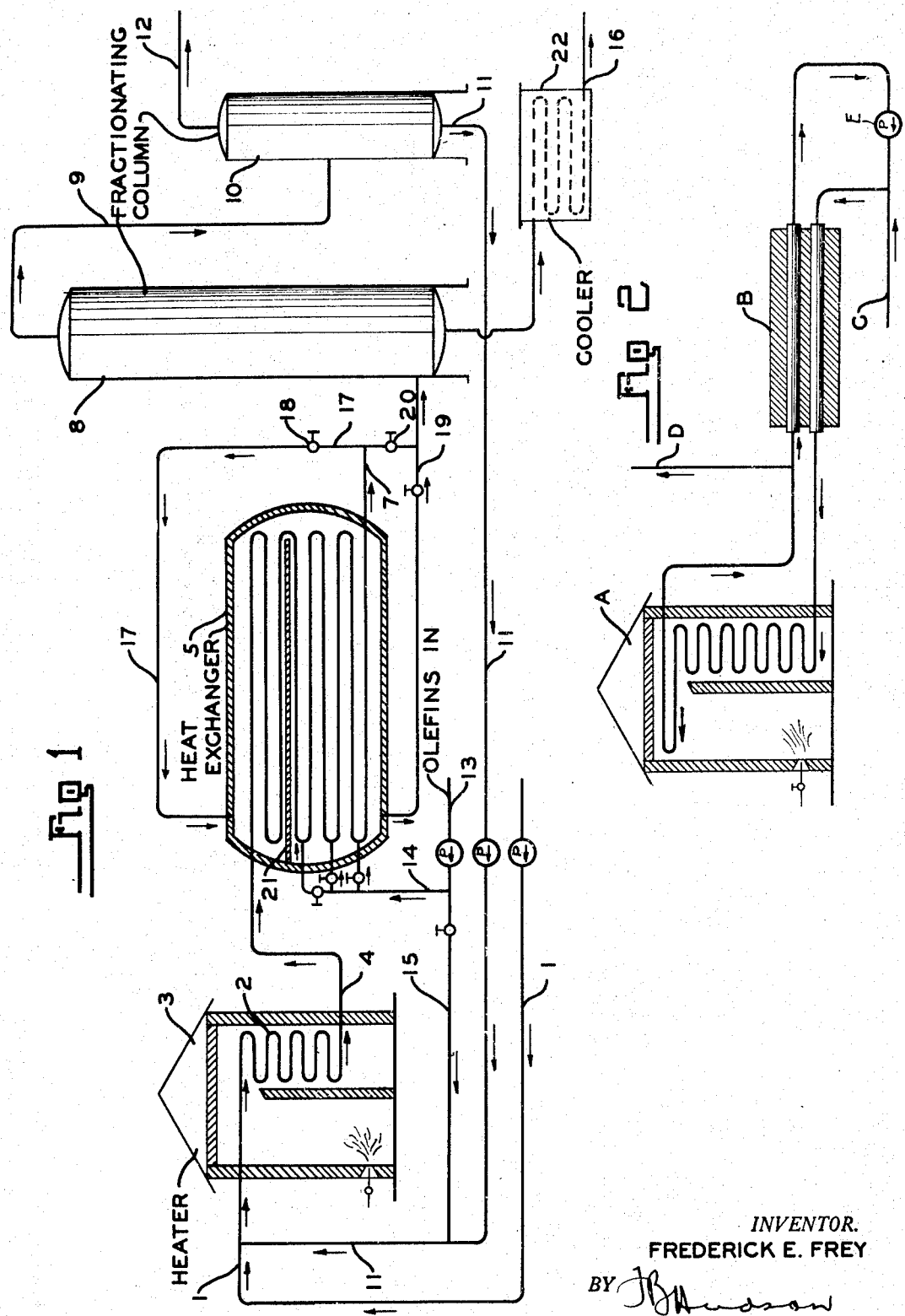

2,104,296

UNITED STATES PATENT OFFICE 2,104,296

PROCESS FOR CONVERTING HYDROCARBONS

Frederick E. Frey, Bartlesville, Okla., assignor to Phillips Petroleum Company, Bartlesville, Okla., a corporation of Delaware Application March 25, 1935, Serial No. 12,981

6 Claims. (Cl. 196—10)

This application is a continuation in part of applicant's co-pending application, Serial No. 731,920, filed June 22, 1934 for a Process for converting hydrocarbons, patented May 21, 1935, Patent No. 2,002,394.

This invention relates to a process for converting hydrocarbons by thermal treatment into products of higher molecular weight and, more specifically, to reacting together paraffins and olefins into products of higher molecular weight which are substantially aliphatic in character and contain a high proportion of the paraffins.

It has been proposed to treat the lower paraffins such as butane and propane under heat and pressure to produce products of higher molecular weight at the same time forming products of lower molecular weight. It has also been proposed to heat simple olefins such as ethylene, propylene and butylene under pressure to obtain higher boiling products comprising essentially olefinic and cyclic polymers. Pressure accelerates the polymerization of olefins and under sufficiently high pressure the reaction takes place readily at temperatures too low to induce the cracking of paraffins. The conversion of lower paraffins, on the other hand, into products of higher molecular weight requires the use of a temperature sufficiently high to effect decomposition into simple paraffins and olefins, and, when the pressure likewise is sufficiently high, the olefins formed then polymerize to larger molecules which undergo transformation into alicyclic and aromatic hydrocarbons as exposure to the high cracking temperature is continued.

A mixture of olefins and paraffins heated under high pressure will ordinarily exhibit the olefin polymerization, which may go to virtual completion before substantial decomposition of the paraffin takes place, olefins of high molecular weight being chiefly formed.

I have discovered that, when the ratio of olefin to paraffin is very low, the olefin polymerization is discouraged by the low partial pressure, and the formation of paraffins of high molecular weight may be effected. This reaction, I have found, will take place under appropriate conditions, hereinafter set forth, to produce such paraffinic products in high yield and with relatively little concomitant formation of less valuable hydrocarbons of lower molecular weight than the reactants. The reaction is particularly suited to the conversion of gaseous paraffins, propane and butane together with any of the gaseous olefins into volatile normally liquid hydrocarbons.

An object of this invention is to provide a more advantageous method for preparing other hydrocarbons from paraffins and olefins in substantially the manner described, taking advantage of the characteristics of the said reactions in order that they may be more readily conducted and controlled.

The process consists in subjecting essentially saturated hydrocarbons, which may be propane or butane, to a temperature at which decomposition will take place but very slowly, and under a pressure of 1000 pounds per square inch or more, adding thereto a small proportion of olefins, not exceeding ten per cent by weight of the paraffins present, allowing the olefins to react, and adding from time to time as reaction proceeds additional small increments of olefins, or a hydrocarbon mixture containing olefins in a proportion exceeding that present in the reacting mixture, while maintaining the concentration of olefins in the said mixture at not more than ten per cent. Hydrocarbons of higher molecular weight than the reactants are produced containing substantial quantities of paraffins, most fractions being saturated to the extent of 50% or more. The products are cooled and the synthesized hydrocarbons may be separated from unreacted hydrocarbons and scission products of low molecular weight by fractionation.

The formation of high proportions of paraffins in the products and the development of high yields of products heavier than the reactants from both paraffins and olefins in a mixture are favored by higher pressures which may be of 5000 pounds per square inch or more, limited only by the strength of the apparatus. At the higher pressures the ratio of olefin to paraffin in the reacting mixture, maintained by successive additions of olefin, should be maintained at a low value; at 4000 pounds pressure, for example, the concentration of added olefin is best maintained below five per cent. The conversion of the paraffinic reactants becomes inefficient when continued heating and portionwise addition of olefin are carried to the point where the greater part of the original paraffins are reacted.

While the exact nature of the reactions taking place is obscure, it is probable that the reaction is essentially the union of a molecule of olefin with one of paraffin as follows:

The reaction will proceed without the use of catalysts, but in some cases they are beneficial.

Fig. 1 illustrates diagrammatically and partly in detail one form of apparatus for realizing the present invention, and, Fig. 2 illustrates a modified form of the invention.

I have found that these reactions, being exothermic, may advantageously be conducted in the following manner. Referring to Figure 1 of the attached drawing, predominately saturated hydrocarbons are fed to the system through the line 1. After being mixed with recycle stock from line 11, and small quantities of olefins, if desired, from line 15, the mixture is fed to the coil 2 in the heater 3. Here it is heated slightly, but generally to a degree insufficient to cause an appreciable reaction. It is then passed through the line 4 into the heat exchanger 5, which may suitably consist as shown of a shell adapted to withstand high pressures, within which is positioned an elongated conduit, around which a stream of hydrocarbon is directed by suitably arranged baffles, such as the one shown at 21, and may be passed generally concurrent to and in indirect heat exchange relation to the elongated conduit, as is shown in Fig. 1. To various points in the conduit olefins are fed through the pipe 14 and reaction takes place in the said conduit with evolution of heat. Reaction products from line 7 may be allowed to flow through line 17 and valve 18 to the passageways surrounding the conduit to impart heat to the unreacted incoming hydrocarbons and extract heat resulting from the reaction, being discharged through line 19 to the fractionater 8. The hydrocarbons leaving the heat exchanger 5 by way of the line 7 will contain, due to the conversion which has taken place therein, a considerable amount of heat units which would ordinarily be lost if it were not for the fact that provision is made to circulate a portion thereof back into the heat exchanger. To accomplish this, part of the converted hydrocarbons leaving through pipe 7 is allowed to flow through the valve 18 and pipe 17 to the top part of the heat exchanger through which it flows in heat exchange relation with the hydrocarbons in the coils and thereby maintains them at conversion conditions. Valve 20 regulates the volume of hydrocarbons passed in this way. By a suitable arrangement of the conduit, the shell may be maintained relatively cool. These olefins fed through the pipe 14 may, of course, be diluted with paraffins or other hydrocarbons, provided that the olefin concentration is higher than that to be maintained within the reacting mixture in the heat exchanger 5. Such dilution will, in fact, be desirable, since it will prevent excessive polymerization of olefins prior to their dispersal throughout the flowing stream passing through the heat exchanger 5, and any excess heat of reaction will also be avoided. From the heat exchanger, the reacted hydrocarbons may pass through the line 7, valve 20 and line 19 to the fractionator 8, where hydrocarbons of higher molecular weight than the reactants will be separated from the products and withdrawn through the cooler 22 and the line 16. The overhead product from the fractionator will go through the line 9 to the fractionator 10, where light gases will be separated and withdrawn through the line 12 while recycle stock containing chiefly unchanged reactants is passed through line 11 back to the heater 2. Olefins will be introduced at 13, and will be pumped through lines 14 and 15 substantially as shown.

The heat exchanger 5 may obviously be varied in design provided the essential conditions for the reaction as set forth in the foregoing are maintained. For example a series of tubes with heat exchange between tubes by means of iron laminae, or molten metal, may be employed to advantage.

In some cases, particularly where olefins in concentrated form are being injected, some means for increasing turbulence at the point of injection may be desirable, in order that simple polymerization of the olefins prior to their mixture with the flowing stream may be minimized.

A further modification of the process is shown in Figure 2, wherein A represents a heater, B a heat exchanger, C and D points for the admission and withdrawal of hydrocarbon and E a pump. Predominantly saturated hydrocarbons are circulated by pump E through the heater A and the exchanger B, olefin-containing hydrocarbons being admitted from time to time, or continuously, through the line C. Hydrocarbons may be withdrawn either continuously or after olefin addition, as desired, through the line D for separation and other processing or for reacting with additional olefin. The essential conditions may be met by maintaining a body of saturated hydrocarbons in a state of turbulence at reaction temperature and pressure while adding olefin-containing hydrocarbons at such a rate that the concentration of added olefin is less than ten per cent of the reaction mixture.

While I have described my process as used to produce normally liquid hydrocarbons from normally gaseous hydrocarbons, it is evident that its utility is not limited to such use. It may be used to convert any straight chain, or moderately branched paraffinic, aromatic or naphthenic hydrocarbon into a mixture of hydrocarbons of more complex structure, thereby effecting significant changes in its properties, such as antiknock value or melting point. Saturated hydrocarbons of high molecular weight as well as low may be used, including heavy petroleum fractions.

What I claim and desire to secure by Letters Patent is:

1. A process for producing hydrocarbon mixtures containing at least 50% of saturated hydrocarbons, comprising heating a stream of predominantly saturated hydrocarbons to a reaction temperature under pressures in excess of 1000 pounds per square inch, adding olefin containing hydrocarbons to the said stream at a plurality of points, the said points being so spaced as to allow appreciable reaction to take place before the subsequent addition of further olefins, and so arranged that indirect generally concurrent heat exchange takes place between the said reacting stream and a representative portion of the stream after reaction takes place following the last olefin addition, and maintaining the content of unreacted added olefins in the mixture at not more than 10% by weight of the hydrocarbons present therein.

2. An improved process for the production of higher boiling predominantly paraffinic hydrocarbons from lower boiling hydrocarbons which comprises continuously heating a stream of predominantly saturated hydrocarbons to a temperature below reaction temperature while under a pressure in excess of 1,000 pounds per square inch, passing the hydrocarbon stream in generally concurrent indirect heat exchange relationship with a stream of still hot reacted hydrocarbons of a higher temperature and heating said hydrocarbon stream to a reaction temperature, continuously adding to the thus heated hydrocarbon stream, still continuing in general concurrent indirect heat exchange with the aforesaid reacted hydrocarbons, olefin containing hydrocarbons at a plurality of points, the points being so spaced as to allow appreciable reaction to take place before the subsequent addition of further olefin-containing hydrocarbon and so arranged that heat of reaction is dispersed by indirect heat exchange between the reacting stream and the said reacted hydrocarbons, controlling the addition of olefin containing hydrocarbons so that the content of unreacted added olefins in the mixture does not exceed 10 per cent by weight of the hydrocarbons present, passing a representative portion of the still hot reacted hydrocarbons in generally concurrent indirect heat exchange relationship with the aforementioned heated stream of hydrocarbons and finally separating normally liquid predominantly paraffinic hydrocarbons from the reacted mixture.

3. The process for producing predominantly paraffinic hydrocarbons of higher molecular weight from paraffins and olefins of lower molecular weight which comprises the steps of maintaining a predominantly paraffinic hydrocarbon mixture in continuous circulation in an endless circulatory cycle which contains a reaction zone and a zone of hydrocarbon introduction, adding olefin containing hydrocarbons at the zone of hydrocarbon introduction thereby producing a hydrocarbon mixture such that the concentration of unreacted added olefin does not exceed ten per cent by weight of the total hydrocarbon mixture, passing the mixture to the reaction zone wherein a reaction takes place and maintaining therein a reaction temperature and a pressure in excess of 1,000 pounds per square inch, passing the reacted mixture back to the zone of hydrocarbon introduction thus completing the endless circulatory cycle, withdrawing at some point in the cycle a portion of the mixture and separating therefrom predominantly paraffinic hydrocarbons of higher molecular weight.

4. In a process for producing higher boiling hydrocarbon mixtures containing at least 50 per cent by weight of paraffinic hydrocarbons from lower boiling hydrocarbons, the steps which comprise heating a stream of predominantly paraffinic hydrocarbons to a preheat temperature and then to a reaction temperature by heat exchange with hotter reaction products under a pressure in excess of 1,000 pounds per square inch, adding olefin containing hydrocarbons to the said stream at a plurality of points, the said points being so spaced as to allow appreciable reaction to take place before further subsequent addition of olefins, the flow of the said reacting stream being so directed that generally concurrent indirect heat exchange takes place between the said reacting stream and a representative portion of the stream after reaction takes place following the last addition of olefin, maintaining the content of unreacted added olefins in the reacting stream at not more than 10 per cent by weight of the hydrocarbons present therein, and separating from the total reacted stream higher boiling hydrocarbons produced.

5. In a process for continuously producing predominantly paraffinic hydrocarbons of high molecular weight from paraffins and olefins of lower molecular weight, the steps which comprise maintaining a stream of predominantly paraffinic hydrocarbons in independent cyclic circulation through a reaction zone wherein a reaction temperature and a pressure in excess of 1,000 pounds per square inch are maintained and wherein a reaction takes place consuming paraffin and added olefin hydrocarbons, introducing into said stream an olefin containing hydrocarbon mixture such that the concentration of added unreacted olefins do not exceed 10 per cent by weight of the total mixture local to the point of introduction, withdrawing from the said stream a portion thereof and separating therefrom predominantly paraffinic hydrocarbons of higher molecular weight.

6. A process for continuously producing predominantly paraffinic hydrocarbon mixtures of high molecular weight from paraffin and olefin hydrocarbons of lower molecular weight, which comprises maintaining a stream composed predominantly of paraffin hydrocarbons in independent cyclic circulation through a heating and reaction zone, wherein a reaction temperature and a pressure in excess of 1,000 pounds per square inch are maintained and wherein reaction takes place consuming said paraffin hydrocarbons and added unreacted olefin hydrocarbons, and through a heat exchanger such that indirect heat exchange takes place between hydrocarbons leaving said heating and reaction zone and hydrocarbons entering said heating and reaction zone, introducing olefin hydrocarbons into said stream in such amount that the added unreacted olefins do not exceed 10 per cent by weight of the total mixture at the point of said olefin introduction, withdrawing from said stream a portion thereof and separating therefrom a hydrocarbon mixture so produced of higher molecular weight and predominantly paraffinic.

FREDERICK E. FREY.